Aug. 9, 1966     HANS-HERMANN KOEPPE     3,264,930
CAMERA VIEWFINDER WITH COMPRESSED FRAME LIMIT MEANS
AND PLURAL REFLECTOR AND LENS MEANS FOR FORMING
EXPANDED FRAME IMAGE

Filed Nov. 8, 1961            3 Sheets-Sheet 1

INVENTOR.
Hans-Hermann Koeppe
BY
Michael S. Striker
Atty.

Aug. 9, 1966 HANS-HERMANN KOEPPE 3,264,930
CAMERA VIEWFINDER WITH COMPRESSED FRAME LIMIT MEANS
AND PLURAL REFLECTOR AND LENS MEANS FOR FORMING
EXPANDED FRAME IMAGE
Filed Nov. 8, 1961 3 Sheets-Sheet 3

INVENTOR.
Hans-Hermann Koeppe
BY
Michael S. Striker
Attorney

United States Patent Office 3,264,930
Patented August 9, 1966

3,264,930
CAMERA VIEWFINDER WITH COMPRESSED FRAME LIMIT MEANS AND PLURAL REFLECTOR AND LENS MEANS FOR FORMING EXPANDED FRAME IMAGE
Hans-Hermann Koeppe, Wiesbaden-Schierstein, Germany, assignor, by mesne assignments, to E. I. du Pont de Nemours and Company, Wilmington, Del., a corporation of Delaware
Filed Nov. 8, 1961, Ser. No. 151,046
Claims priority, application Germany, Nov. 10, 1960, A 35,992
5 Claims. (Cl. 88—1.5)

The present invention relates to cameras.

More particularly, the present invention relates to cameras which are equipped to indicate in the field of the viewfinder the limits of the area of the viewing field which will be exposed on the film frame. These limits are generally indicated by frame limits, images of which are visible to the operator as the subject is viewed through the viewfinder.

In general there are two basic types of structures for providing the operator with an indication of the area of the viewing field which will be exposed on the film frame. One of these types is an arrangement where frame limits are located directly in the viewfinder, at the front window thereof, for example, so that the operator sees these frame limits while viewing the subject. This type of construction has the great advantage of requiring an extremely small amount of space, since hardly any space greater than the viewfinder itself is required, but it suffers from the serious drawback of failing to provide frame limit images which are sufficiently bright at all times to reliably indicate to the operator under all conditions the limits of the area of the viewing field which will be exposed on the film frame.

The second type of structure has the frame limits located beside the viewfinder and includes an optical structure which projects images of these frame limits into the field of the viewfinder. Insofar as efficiency of operation is concerned, this latter type is far superior to the former type since it reliably provides at all times and under all conditions brilliant clear images of the frame limits so that there is never a time when the operator does not or cannot see the limits of the area of the viewing field which will be exposed on the film frame. However, while this latter type of construction does possess this great advantage over the former type of construction, nevertheless it possesses the drawback of requiring a substantial amount of space beyond the viewfinder itself, and because of the desire to provide extremely compact, light-weight cameras, this type of structure is undesirable from this standpoint.

One of the objects of the present invention, therefore, is to provide a structure capable of indicating to the operator in the field of view of the viewfinder the limits of the area of the viewing field which will be exposed on the film frame, while at the same time guaranteeing full brilliance of these limits under all conditions and at all times, without, however, requiring the structure to occupy the same amount of space as the conventional structure which will accomplish this result also.

Another object of the present invention is to provide for a camera a structure located beside the viewfinder and capable of providing in the viewing field of the viewfinder an accurate image of the limits of the area of the viewing field which will be exposed on the film frame, while at the same time occupying beside the viewfinder only a relatively small fraction of the space occupied by conventional structure for producing the same results.

A further object of the present invention is to provide a structure which is capable not only of providing in the field of the viewfinder images of the frame limits but also additional images providing additional information.

Also the object of the present invention include the provision of a structure which on the one hand is capable of accomplishing the above objects while being extremely simple and reliable as well as compact, and which on the other hand does not require any changes to be made in the construction of the viewfinder itself.

With these objects in view the invention includes, in a camera, a viewfinder means having a viewing field and a frame limit means located beside the viewfinder means and having at least a pair of frame limit portions which are closer to each other than the distance required to provide in the viewing field of the viewfinder means images of the frame limit portions accurately indicating the area of the viewing field which will be exposed on a film frame. An optical means cooperates with the frame limit means and with the viewfinder means for correcting the images of the frame limit portions to provide in the viewing field frame limit images which accurately indicate the area of the viewing field which will be exposed on a film frame.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which:

Figure 1:
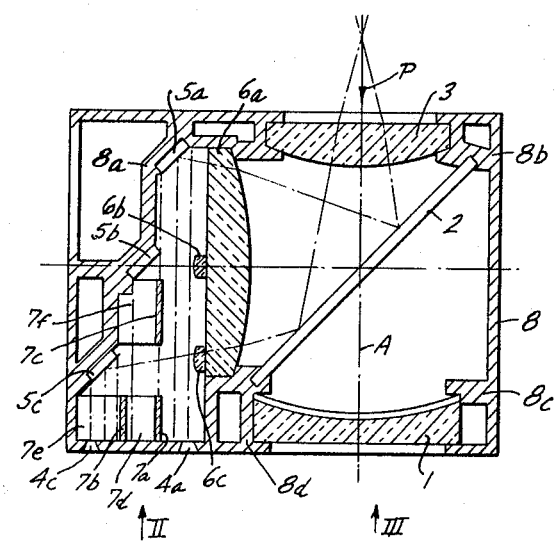
FIG. 1 is a sectional plan view of one possible embodiment of a structure according to the present invention.
Figure 2:
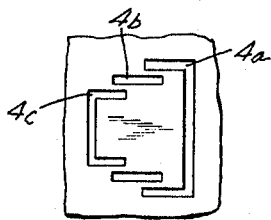
FIG. 2 is a fragmentary illustration of that part of the front wall of the camera which carries the frame limiting portions of the invention.
Figure 3:
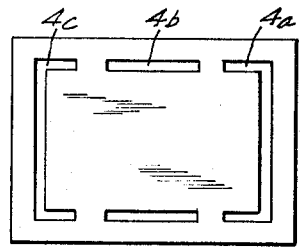
FIG. 3 illustrates the image of the frame limiting portions of FIG. 2 seen in the viewing field with the structure of FIG. 1.
Figure 4:
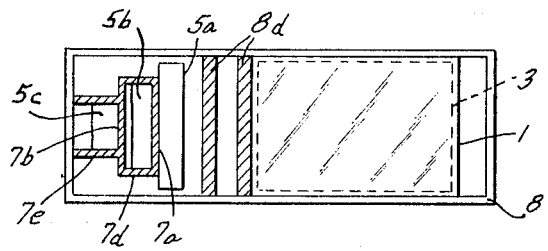
FIG. 4 is a front elevation of the structure of FIG. 1 with the front wall removed so as to clearly illustrate the structure behind this front wall.

Referring to FIGS. 1–4, the viewfinder structure illustrated therein includes the front lens 1 of the viewfinder, this lens being rectangular, as is apparent from FIGS. 1 and 4. The viewfinder means includes in addition to the front lens 1 a semi-transparent reflector 2 located within the viewfinder in a plane which makes a 45° angle with the optical axis A of the viewfinder. On the side of the semi-transparent reflector 2 opposite from the front lens 1 is located the ocular 3 through which the operator views the subject, the operator looking into the viewfinder in the direction of the arrow P shown in FIG. 1. These elements of the viewfinder means are carried by the wall structure 8 which includes the portions 8b and 8c engaging the elements 1–3 at their right portions, as viewed in FIG. 1, while the portion 8d of the camera wall structure engages these portions at their left ends, as viewed in FIG. 1.

A frame limit means is located beside this viewfinder means, and this frame limit means, in the illustrated example, is in the form of a front wall portion of the camera located beside the front lens 1 of the viewfinder means and formed with the openings 4a–4c having the configuration and arrangement indicated in FIG. 2, so that light can pass through these openings 4a–4c into the interior of the camera. These openings, which form the frame limit portions of the frame limit means, may be closed by any suitable transparent material, for example.

An optical means cooperates with the frame limit means shown in FIG. 2 for projecting an image thereof into the field of the viewfinder, and in the field of the viewfinder the image of the frame limit means will have the configuration ilustrated in FIG. 3, and it is this configuration which accurately limits that area of the viewing field which will be exposed on a film frame. It will be noted that the actual frame limit portions in FIG. 2 are located much closer together than the distance required to provide an image as shown in FIG. 3, and in addition the frame limit portion 4c is shorter than required, as is evident from the comparison of the image 4c of FIG. 3 with the frame limit portion 4c of FIG. 2. Moreover, it will be noted that the frame limit portion provided by the horizontal sections 4b are also located closer to each other and closer to the other frame limit portions in FIG. 2 than in FIG. 3 where they are properly arranged to provide an accurate limiting of that area of the viewing field which will be exposed on a film frame. It is conventional to provide frame limit portions in the front wall having the configuration indicated in FIG. 3 so that with a conventional construction a far greater space is required than is required by the structure shown in FIG. 2.

The optical means which projects from the frame limit means of FIG. 2 an image as shown in FIG. 3 into the field of the viewfinder includes the plurality of reflectors 5a–5c which are respectively located behind the frame limit portions 4a–4c. The wall 8a carries these reflectors or mirrors 5a–5c in the positions shown most clearly in FIG. 1, and it will be noted that the angular positions of these reflectors or mirrors 5a–5c is such that while the central reflector 5b which cooperates with the frame limit portions 4b makes a 45° angle with an axis which is perpendicular to the optical axis A, the remaining reflectors 5a and 5c make different angles for projecting the images of the frame limit portions 4a and 4c respectively along the paths indicated in FIG. 1. These images are directed by a lens means 6 into the viewfinder means, and this lens means 6 includes the main lens portion 6a and the pair of additional lens portions 6b and 6c which may be integral with the lens portions 6a or which may be in the form of separate lenses fastened in any suitable way to the lens 6a as by being glued thereto with a transparent adhesive well-known in the art. The main lens 6a cooperates with the image of the frame limit portion 4a reflected from the reflector 5a to provide the image 4a shown in FIG. 3, while the combination of the lenses 6a and 6b cooperate with the reflector 5b to provide in the viewing field the image 4b of the pair of central horizontal sections of the frame limit portion 4b. Finally the lenses 6c and 6a cooperate with the image of the frame limit portion 4c reflected from the reflector 5c to provide in the viewfinder field the image 4c shown in FIG. 3.

As is apparent from FIG. 4, a horizontal plane bisecting the reflector 5c will also bisect the reflectors 5b and 5a, but the reflector 5b is longer than the reflector 5c while the reflector 5a is longer than the reflector 5b. The length of the reflector 5c corresponds substantially to the height of the frame limit portion 4c so that the sections of the frame limit portions 4b which overlap the frame limit portion 4c in FIG. 2 cannot be reflected by the reflector 5c. In addition, there is located in alignment with the reflector 5c between the latter and the frame limit portion 4c a light shield 7b having upper and lower horizontal wall portions 7e, as indicated in FIGS. 1 and 4, in order to prevent stray light from reaching the reflector 5c, and it will be noted that the distance between the horizontal wall portions 7e of the light shield 7b as well as its width corresponds to the dimensions of the frame limit portion 4c. In the same way a light shield 7a having upper and lower wall portions 7d is connected to and located beside the light shield 7b for preventing stray light from reaching the reflector 5b, and the height of this reflector 5b corresponds to the vertical distance between the sections of the frame limit portion 4b. Because of the distance that the reflector 5b is located behind the frame limit portion 4b, there is located wthin the camera between the shield 7a and the reflector 5b an additional shield 7c having a vertical wall aligned with the right vertical wall of the shield 7a and having horizontal walls 7f respectively located at the same elevations as the horizontal walls 7d. The height or length of the reflector 5b is such that the left end portions of the upper and lower parts of the frame limit portion 4a will not be reflected by the reflector 5b. Finally, the reflector 5a is the longest reflector and has a length corresponding to the height of the frame limit portion 4a, and it will be noted that the left edge of the reflector 5a is positioned at least slightly to the right of the horizontal sections of the frame limit portion 4b, so that the reflector 5a can only reflect the frame limit portion 4a.

The use of these plurality of reflectors 5a–5c which are staggered with respect to each other in the manner shown in FIG. 1 greatly reduces the space which would be required by a single mirror or reflector extending at a 45° angle across the axis which is perpendicular to the optical axis A and located behind a frame limit structure having the configuration indicated in FIG. 3. Thus, while with the structure of the invention an image as shown in FIG. 3 is provided with all of the brilliancy and reliability which would be obtained from a conventional structure requiring much more space, this space requirement has been greatly cut down so that the camera is lighter and more compact.

Figure 8:
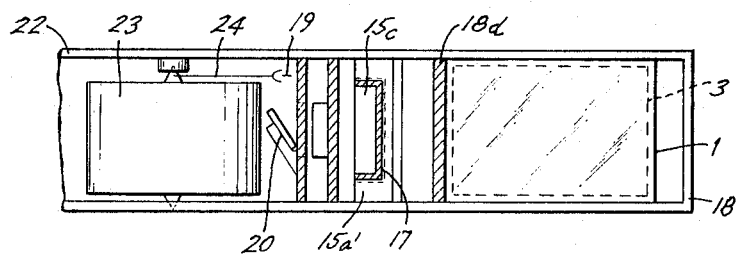
FIG. 8 is a front elevation of the structure of FIG. 5 with the front wall removed to clearly illustrate the structure behind this front wall.
Figure 5:
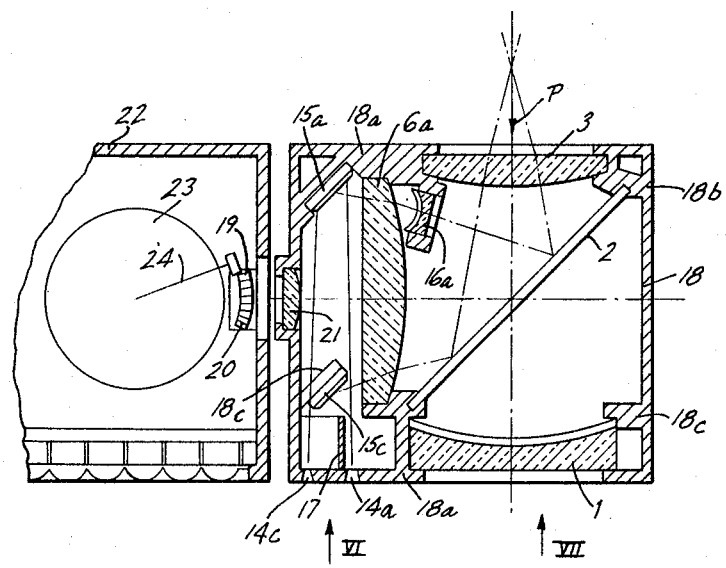
FIG. 5 is a sectional plan view of another embodiment of a structure according to the present invention.
Figure 6:
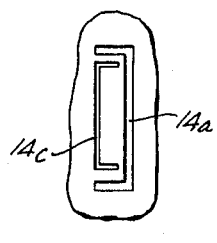
FIG. 6 is an illustration of that part of the front wall of the camera of FIG. 5 which carries the frame limit portions.

The embodiment of the invention which is illustrated in FIGS. 5–8 illustrates another application of the principle of the invention, but in this embodiment an even greater compactness is provided. Referring to FIGS. 5 and 8, it will be seen that a wall structure 18 similar to the wall structure 8 has portions 18a–18d supporting the same viewfinder elements 1–3 as well as a lens 6a which may be identical with the lens 6a of FIG. 1 and the portion 18a of the wall structure 18 carries in this case only a pair of reflectors 15a and 15c which respectively correspond to the reflectors 5a and 5c. These reflectors 15a and 15c of the optical means of FIGS. 5–8 are respectively located behind a pair of frame limit portions 14a and 14c indicated in FIG. 6. Thus, there is nothing in this embodiment which corresponds to the frame limit portion 4b shown in FIG. 2 and the structure for projecting an image thereof into the field of the viewfinder. It will be noted that the frame limit portions 14a and 14c, as well as the frame limit portions 4a and 4c, are in the form of oppositely directed openings of substantially C-shaped configuration. However, while in FIG. 6 the smaller or shorter frame limit portion 14c nests within the frame limit portion 14a, in FIG. 2 it is the frame limit portion 4b which nests partly within the frame limit portion 4a, while the frame limit portion 4c nests partly between the frame limit portion 4b at its upper and lower parts, so that while the frame limit portions of both embodiments have an overlapping relationship with respect to each other the arrangement of FIG. 6 is indeed more compact.

Figure 7:
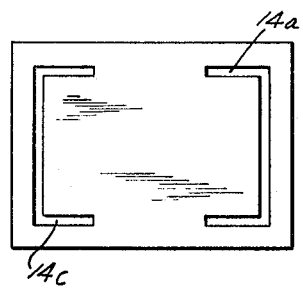
FIG. 7 is an illustration of the image of the frame limit portions of FIG. 6 seen in the viewing field of the viewfinder of FIG. 5.

As may be seen from FIG. 8 the reflector 15c has a height which corresponds to the length of the frame limit portion 14c and is aligned therewith, a shield 17 being located between the frame limit portion 14c and the reflector 15c to prevent any stray light from reaching the reflector 15c, and in this case the lens 6a cooperates with the reflector 15c to provide in the viewing field an image of the frame limit portion 14c which is corrected as indicated at 14c in FIG. 7.

The reflector 15a is longer than the reflector 15c having a lower portion 15a', for example, as indicated in FIG. 8 extending below the reflector 15c, and of course a corresponding upper portion of the reflector 15a extends above the reflector 15c and in addition the reflector 15a extends to the right, as viewed in FIGS. 5 and 8, beyond the reflector 15c as well as the shield 17. Thus, in a horizontal projection it will be seen that the frame limit portion 14a will extend around the reflector 15c and in this way only the frame limit portion 14a will be reflected by the reflector 15a toward the viewfinder means of FIGS. 5 and 8. It should be noted that no light is reflected from the rear of the reflector 15c or the supporting structure 18c therefor, so that the reflector 15a does not project into the viewing field an image of the rear of the reflector 15c or its supporting structure. In this case the lens means includes in addition to the lens 6a a negative lens 16a cooperating with the lens 6a to provide from the image reflected from the reflector 15a the image 14a which is indicated in FIG. 7. Thus, with this embodiment also there will be provided in the field of the viewfinder a frame limit image which is fully corrected to provide an accurate indication of the area of the viewing field which will be exposed on the film frame, while at the same time the viewfinder cooperates with a structure which is far more compact than the conventional structure required to accomplish the same results.

With the embodiment of FIGS. 5–8 it is also possible to project additional information into the field of the viewfinder. For example, as may be seen from FIGS. 5 and 8 there is located within the camera housing portion 22 a light meter 23 having a pointer 24 which cooperates at its outer end with a scale 19. The top wall of the camera is provided with a suitable opening through which light may reach the scale 19 which is made of a suitable transparent or translucent material carrying opaque graduations, and beneath the scale 19 is located the reflector 20 which is aligned with an opening in the wall which carries this reflector 20 so that an image of the scale 19 and the portion of the pointer 24 which cooperates therewith will be reflected by the reflector 20 to the right through the lens 21 shown in FIG. 5 and then through the lens 6a into the viewing field, so that the operator will simultaneously see in the field of view not only the frame limits and the subject which is to be photographed but also the cooperation of the pointer 24 with the scale 19 so that the operator will know whether or not a proper exposure can be made or what settings must be made on the camera.

Figure 9:
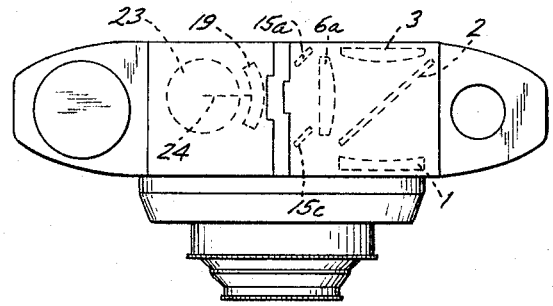
FIG. 9 is a diagrammatic top plan view of a camera in which the structure of FIGS. 5–8 is located, FIG. 9 illustrating the orientation of this structure in a camera.

The orientation of the structure of FIGS. 5–8 along the upper part of a camera is indicated diagrammatically in FIG. 9. As is apparent from FIG. 9, because of the extremely small amount of space required for the frame limit means shown in FIG. 6 and the optical structure cooperating therewith to project an image thereof into the viewing field, there is no difficulty in locating along the upper part of the camera, even though it is quite a small camera, not only the frame limit structure but also the light meter structure, so that it becomes possible to provide in an automatic or semi-automatic camera, which is capable of at least partly setting the camera in an automatic manner, all of the features required for automatic operation and for an indication of frame limits without any difficulty.

It will be noted that the optical means of the invention not only corrects the position and length of the various frame limit portions with respect to each other, but in addition the thickness of these frame limit portions is also corrected, as is immediately apparent on the one hand from the comparison of FIGS. 2 and 3 and on the other hand from a comparison of FIGS. 6 and 7.

Of course, various details of the above-described structure of the invention may be changed. For example, suitable structure may be provided for adjusting the positions of the several reflectors respectively located behind the frame limit portions, and also the several frame limit portions may themselves be carried by separate plates which are adjustable one with respect to the other. Moreover, the lens instead of being constructed of conventional glass elements may be made of a suitable plastic material and all of the lens structure may be in the form of a single unitary lens where the lenses 6b and 6c of FIG. 1, for example, are integral with the lens 6a. In addition, various information in addition to that discussed above may be directed into the viewing field, such as the settings of the exposure aperture and exposure time or the setting of the focusing ring to indicate the distance between the subject and the camera.

It will be understood that each of the elements described above, or two or more together, may also find a useful application in other types of cameras differing from the types described above.

While the invention has been illustrated and described as embodied in indicating arrangements for cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific apects of this invention and, therefore, such adaptations should and are intended to be comprehended within the meaning and range of equivalence of the following claims.

What is claimed as new and desired to be secured by Letters Patent is:

1. In a camera, in combination, viewfinder means having an optical axis and a viewing field; frame limit means located beside said viewfinder means and including frame limit portions positioned with respect to each other in a compressed and telescoped pattern as compared to a normal rectangular pattern; a plurality of elongated narrow mirror strips respectively arranged behind said frame limit portions, being angled with respect to the viewfinder axis, and being offset from each other in the direction of said axis, said mirrors respectively being of different lengths corresponding to the lengths of said frame limit portions and respectively directing images thereof toward said viewfinder means; baffle means located between said frame limit means and mirrors for baffling said mirrors to provide for selective reflection by said mirrors of said frame limit portions, respectively; and lens means located between said mirrors and viewfinder means and respectively having sections of different powers providing for the images reflected by said mirrors enlargement ratios imaging all portions of said frame limit means at the same size and forming an image having said normal rectangular pattern in said viewing field of said viewfinder means.

2. In a camera, in combination, viewfinder means having an optical axis and a viewing field; frame limit means located beside said viewfinder means and including frame limit portions positioned with respect to each other in a compressed pattern; a plurality of narrow reflector means respectively arranged in separate planes behind said frame limit portions, said reflector means being angled with respect to the viewfinder axis and being of different lengths corresponding to the lengths of said frame limit portions to direct the images thereof toward said viewfinder means;

baffle means located between said frame limit means and reflector means to prevent light from straying between said plurality of reflector means; and lens means located between said mirrors and viewfinder means and having sections of different optical power for the images reflected by said plurality of reflector means to transfer all portions of said frame limit means as an equal size image in the viewing field of said viewfinder means.

3. A camera as described in claim 2 where said plurlity of reflector means is a plurality of mirrors.

4. A camera as described in claim 2 where said frame limit portions in said frame limit means are arranged in a non-contiguous and overlapping relationship.

5. A camera as described in claim 2 where said frame limit portions comprise a pair of oppositely directed C-shaped members one of which is shorter and symmetrically arranged with respect to the other.

References Cited by the Examiner
UNITED STATES PATENTS

| | | | |
|---|---|---|---|
| 1,343,074 | 6/1920 | Beck | 88—32 |
| 2,525,558 | 10/1950 | Mihalyi | 88—1.5 |
| 3,033,090 | 5/1962 | Winkler. | |

DAVID H. RUBIN, *Primary Examiner.*